United States Patent [19]

Hara et al.

[11] Patent Number: 4,975,607
[45] Date of Patent: Dec. 4, 1990

[54] FREQUENCY GENERATOR WITH SUPERIMPOSED GENERATION COIL

[75] Inventors: Masayoshi Hara; Shinichi Niwa; Masayuki Ishikawa; Yukio Okada, all of Komagane, Japan

[73] Assignee: Kabushiki Kaisha Sankyo Seiki Seisakusho, Nagano, Japan

[21] Appl. No.: 376,847

[22] Filed: Jul. 7, 1989

[30] Foreign Application Priority Data

Jul. 11, 1988 [JP] Japan .............................. 63-91812[U]
Dec. 27, 1988 [JP] Japan .............................. 63-168808
Dec. 27, 1988 [JP] Japan .............................. 63-168809

[51] Int. Cl.$^5$ ............................................ H02K 7/00
[52] U.S. Cl. .................................... 310/67 R; 29/846; 310/68 R; 310/208; 310/DIG. 6
[58] Field of Search ................. 29/596, 830, 846, 847; 310/68 R, 268, DIG. 6, 42, 45, 208; 427/54.1, 55, 96

[56] References Cited

U.S. PATENT DOCUMENTS 4,668,884  5/1987  Amao et al. ........................ 310/268
4,808,434  2/1989  Bennett et al. ........................ 427/55

FOREIGN PATENT DOCUMENTS 58-33958  2/1983  Japan .................................. 310/208
262038  10/1988  Japan .................................. 310/208

Primary Examiner—Steven L. Stephan
Assistant Examiner—D. L. Rebsch
Attorney, Agent, or Firm—Flynn, Thiel, Boutell & Tanis

[57] ABSTRACT

A frequency generator includes a circuit board having one surface on which a generating coil pattern and a wiring pattern are printed in stacked relationship via an insulating layer. In a preferred embodiment, the coil is pointed over the wiring pattern.

10 Claims, 4 Drawing Sheets

FREQUENCY GENERATOR WITH SUPERIMPOSED GENERATION COIL

FIELD OF THE INVENTION

This invention relates to a frequency generator which may be used, for example, in speed controls of various driving motors.

BACKGROUND OF THE INVENTION

A frequency generator is often used in a driving motor of a video tape recorder to drive a rotary cylinder head, in a driving motor of an optical scanning apparatus to drive a rotary multi-plane mirror or in other such driving motors. Such a frequency generator comprises a magnetic flux generator rotatable integrally with a rotor or other rotary member of a motor and a generating coil pattern opposed to the magnetic flux generator.

FIG. 4 shows a motor having such a prior art frequency generator. In FIG. 4, a depressed cup-shaped rotor yoke 32 of a motor 31 includes a rotary shaft 35 in an integral form, and the rotary shaft 35 is rotatably supported by a bearing 40 in a cylindrical holder portion 39 provided in a stationary drum of a rotary cylinder head. A motor mounting portion 38 is provided in a part of the stationary drum in the form of a step. On the motor mounting portion 38 are mounted a printed wiring board 44 and an iron board 46 in a stack, with their center holes engaging the holder portion 39. The iron board 46 is further overlaid with a stator core 42 which encircles the holder portion 39. The stator core 42, iron board 46 and wiring board 44 are fixed on the stationary drum by applying screws passing through themselves to the motor mounting portion 38. A driving coil 43 of a predetermined number of phases is wound on the stator core 42.

On the inner circumferential surface of the rotor yoke 32 is secured a cylindrical rotor magnet 33 whose inner circumferential surface is opposed to the outer circumferential surface of the stator core 42, maintaining a predetermined distance therebetween. The rotor magnet 33 is magnetized in the thickness direction thereof throughout its substantially entire length except its lower end portion as shown in FIG. 6 to form a predetermined number of magnetic poles (6 poles in the illustrated example) in the circumferential direction to behave as a magnet portion 52. The lower end of the rotor magnet 33 is magnetized in the axial direction to form an adequate number of magnetic poles (for example, 24 poles) in the circumferential direction to behave as a magnetic flux generating portion 51 of the frequency generator. On the iron board 46 opposed to the magnetic flux generating portion 51 and via an insulating layer is formed by etching or other process a generating coil pattern 47 of the frequency generator as shown in FIG. 6. The wiring board 44 is a single-surface printed board, and appropriate circuit elements 48 are provided on the printed surface. On the opposite surface of the wiring board 44 is overlaid the iron board 46.

FIG. 5 shows an example where the printed board 44 is a double-surface printed board. On one of the printed surfaces is provided appropriate circuit elements 48, and on the other printed surface is provided the generating coil pattern 47 of the frequency generator, thereby omitting the iron board 46 used in the example of FIG. 4.

According to the prior art arrangement of FIG. 4, the use of both the circuit board and the iron board increases the number of parts and increases the manufacturing cost. The use of the double-surface printed board in the prior art of FIG. 5 also increases the manufacturing cost. Further, in both the prior art examples, the circuit board is manufactured by first etching a large board material to form a number of generating coil patterns thereon and by subsequently press-cutting the large board material into respective circuit boards and concurrently punching out center holes for engagement with the holder portion. Therefore, a positional inconsistency often occurs between the center of the center hole and the center of the generating coil pattern. When the center of the center hole is off the center of the generating coil pattern, the center of the generating coil pattern deviates from the rotation center when the center hole of the circuit board engages the holder portion. This increases the wow flutter of the output of the frequency generator.

OBJECT OF THE INVENTION

It is therefore an object of the invention to provide a frequency generator using a decreased number of parts and manufactured at a lower cost by providing a wiring pattern on a single surface of a circuit board and by overlappingly printing a generating coil pattern on the wiring pattern.

It is noted that an arrangement including a multi-layer wiring on a substrate is disclosed in Japanese U.M. publication No. 60-181150A. However it provides a generating coil pattern itself in two layers on a substrate of a frequency generator, and it is essentially different from the inventive arrangement.

More specifically, the invention does not use an independent or specific substrate for a frequency generator, but provides both a wiring pattern and a generating coil pattern on a single surface of a wiring board of a motor driving circuit to provide a frequency generator using a less number of parts and manufactured at a lower cost.

SUMMARY OF THE INVENTION

According to the invention, there is provided a frequency generator including a rotary body which rotates about a shaft, a magnetic flux generating portion which rotates concentically of said shaft, a generating coil pattern opposed to said magnetic flux generating portion and a circuit board, wherein said circuit board has one surface on which said generating coil pattern and a wiring pattern for connection among circuit elements and an external circuit are disposed and wherein said generating coil pattern is printed on an insulating layer which is provided on said wiring pattern.

DETAILED DESCRIPTION

A frequency generator embodying the invention is described below in detail, referring to FIGS. 1 to 3. The illustrated embodiment is an example used in a driving motor for driving a rotary cylinder head.

Figure 1:
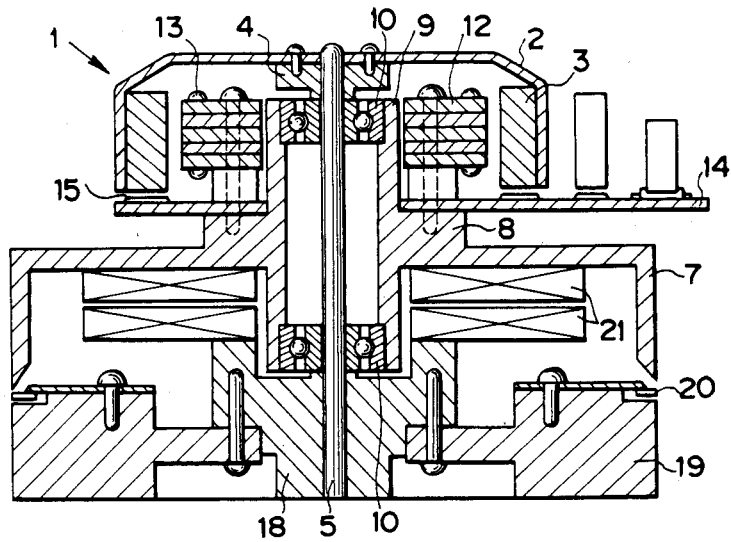
FIG. 1 is a longitudinal cross-sectional view of a frequency generator embodying the invention.
Figure 2:
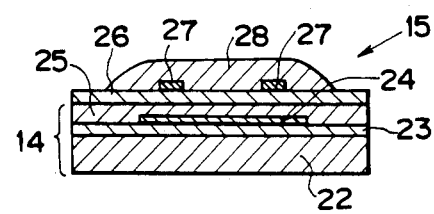
FIG. 2 is a fragmentary cross-sectional view of a portion including a generating coil pattern in the embodiment of FIG. 1.

In FIG. 1, a driving motor 1 for rotating a rotary cylinder head has a depressed cup-shaped rotor yoke 2. In the center of the rotor yoke 2 is mounted an end of a rotary shaft 5 via a boss 4. A stationary drum 7 of the rotary cylinder head has a cylindrical holder portion 9 in the form of a projection at one end thereof. The rotary shaft 5 is rotatably supported by a pair of upper and lower bearings 10—10 in the holder portion 9. The stationary drum 7 has a step-shaped motor mounting portion 8 between the major body and the holder portion 9 thereof. A printed wiring board 14 is disposed on the motor mounting portion 8, with its center hole engaging the holder length 9. On the wiring board 14 is further mounted a stator core 12 of the motor 1 which encircles the holder portion 9. The stator core 12 and the wiring board 14 are fixed to the stationary drum 7 by fixing screws which pass through these members and engage the motor mounting portion 8. On the stator core 12 is wound a driving coil 13 of a predetermined number of phases.

Figure 6:
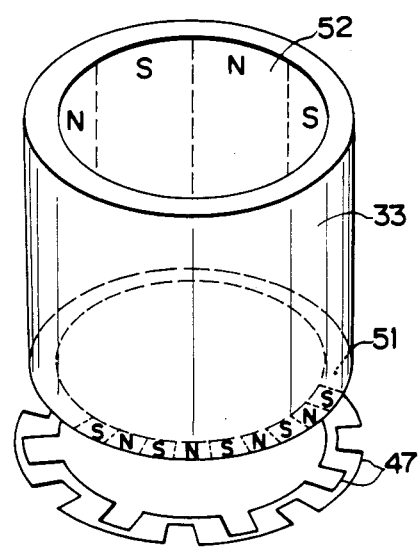
FIG. 6 is a perspective view of a magnet and a generating coil pattern used in the frequency generator.

On the inner circumferential surface of the rotor yoke 2 is fixed a cylindrical rotor magnet 3, maintaining a distance between the inner circumferential surface thereof and the outer circumferential surface of the stator core 12. The rotor magnet 3 has the same structure as shown in FIG. 6. That is, all of it except the lower end is magnetized in the thickness direction to form a predetermined number of magnetic poles in the circumferential direction to behave as a driving magnet portion. The lower end of the rotor magnet 3 is magnetized in the axial direction to form a predetermined number of magnetic poles to behave as a magnetic flux generating portion of the frequency generator.

The lower end of the rotary shaft 5 extends beyond the lower surface of the stationary drum 7, and a rotary drum 19 is mounted on the extended end of the rotary shaft 5 via a disk 18. The rotary drum 19 and the stationary drum 7 form a rotary magnetic head generally used in a video tape recorder, digital audio tape recorder, etc. More specifically, a magnetic head 20 is mounted on the rotary drum 19, with its tape-contact surface being exposed through a gap between the rotary drum 19 and the stationary drum 7. Further, a rotary transformer 21 for sending or receiving signals to or from the magnetic head 20 is mounted on both drums 19 and 7. The rotary drum 19 and the rotor yoke 2 of the motor 1 form a rotary body which rotates together with the magnetic flux generating portion of the frequency generator.

On the circuit board 14 is formed the frequency generating portion 15 which is opposed to the magnetic flux generating portion. FIGS. 2 and 3 show details of the frequency generating portion 15. The wiring board 14 consists of a base element 22, a resist layer 23 formed on one surface of the base element 22, a wiring pattern 24 formed on the resist layer 23 by etching or other process, and a resist layer 25 covering the wiring pattern 24. On the wiring board 14 is provided an undercoat 26 as an insulating layer, and a generating coil pattern 27 is printed on the undercoat 26. Therefore, the generating coil pattern 27 is superposed on the wiring pattern 24 via the insulative undercoat 26. The generating coil pattern 27 may be formed by printing silver paste or other conductive material. On the generating coil pattern 27 is provided an overcoat 28.

When manufacturing the above-described circuit board 14, the wiring pattern 24 is first formed on the board material by copper etching or other process. The board material is subsequently cut and divided into individual circuit board members. Each board member is subsequently properly positioned, referring to its center hole 29 shown in FIG. 3 which has been formed previously, and the generating coil 27 is printed around the center hole 29. The generating coil pattern 27 is in the form of annularly continuous waves, as viewed in a greater detail in FIG. 3. The annular generating coil pattern 27 is printed, with its center coinciding with the center of the center hole 29. An end of the wiring pattern 24 is connected to a connector 30.

Figure 3:
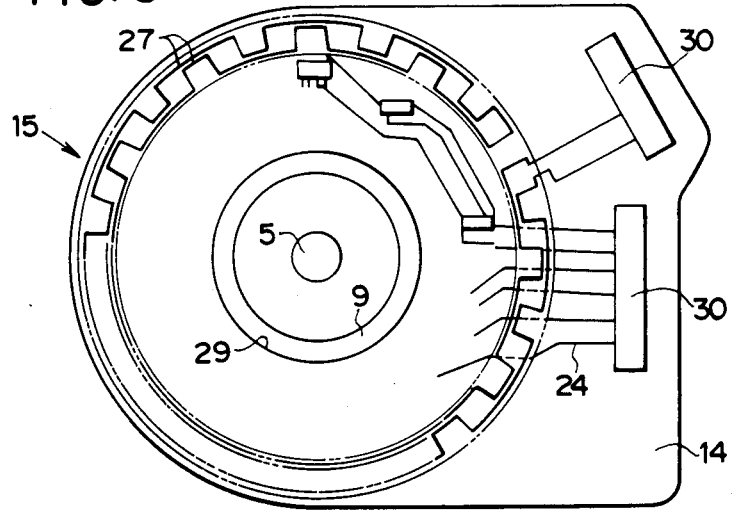
FIG. 3 is a plan view of a circuit board in the embodiment of FIG. 1.
Figure 4:
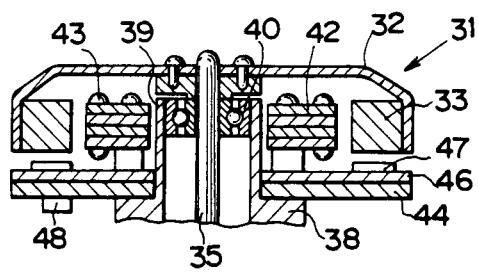
FIG. 4 is a longitudinal cross-sectional view of a prior art frequency generator.
Figure 5:
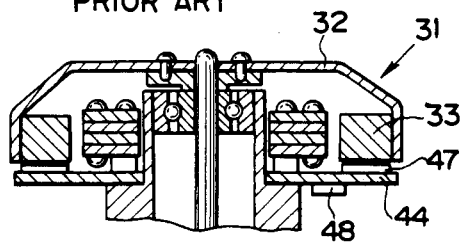
FIG. 5 is a longitudinal cross-sectional view of a further prior art frequency generator.

In FIGS. 1 and 3, the wiring board 14 is fixed to the motor mounting portion 8 by engaging the center hole 29 with the holder portion 9 of the stationary drum 7. Therefore, by improving the roundness of the outer circumference of the holder portion 9 and the engaging accuracy between the center hole 29 and the holder portion 9, the rotary shaft 5 and the center hole 29 are held in a proper concentric relationship. When the rotary shaft 5 and the center hole 29 are concentric, centers of the rotary shaft 5 and the generating coil pattern 27 coincide so as to diminish the wow flutter of the output of the frequency generator comprising the magnetic flux generating portion of the rotor magnet 3 and the generating coil pattern 27 which are held in an opposed relationship.

In a normal operative condition, the rotary magnetic head is positioned in the upper side, and the driving motor is positioned in the lower side. FIG. 1, however, shows the rotary magnetic head in the lower side and shows the motor 1 in the upper side for a better understanding of the system.

When the driving coil 13 is energized, a rotation torque is produced in the rotor magnet 3 due to an attracting or repulsing force between magnetic poles of the stator core 12 and the rotor magnet 3, and the rotor yoke 2 and the rotary drum held in an integral relationship are rotated. At that time, the tape contacting surface of the magnetic head 20 is rotated together with the rotary drum 19, while contacting a tape which is wound on the rotary drum 19 and the stationary drum 7 and transported at a constant speed, and the magnetic head 20 records or reproduces signals on or from the magnetic tape. Signals recorded or reproduced by the magnetic head 20 are given to or from an external recording and reproducing circuit via the rotary transformer 21.

When the rotor magnet 3 rotates together with the rotor yoke 2, a magnetic flux departing from the magnetic flux generating portion across the generating coil pattern 27 moves as the magnet 3 rotates, and an a.c. signal is induced in the generating coil pattern 27. The frequency of the signal changes with the rotating speed of the motor 1. Therefore, by controlling the speed so as to maintain a constant frequency of the generated signal, the rotating speed of the rotary drum 19 is held at a constant value.

According to the above-described embodiment, since the generating coil pattern 27 is provided on the wiring pattern 24 of the circuit board 14 via the insulating layer 26, the generating coil pattern 27 of the frequency generator can be formed, using a single-surface printed board having a small pattern forming area. Therefore, it is not necessary to stack two circuit boards or use a double-surface printed board, and it is possible to provide an economical frequency generator. Further, the generating coil pattern 27 which is never interfered by the wiring pattern 24 can be provided in a continuous form throughout the entire circumference without being cut off at any point thereof. Additionally, since the generating coil pattern 27 is printed, referring to the center hole 29 of the circuit board 14 which is held concentic of the rotary shaft 5 of the motor 1 as a rotary body, positional deviation of the center of the generating coil pattern 27 is substantially removed, and the wow flutter in the output of the frequency generator is diminished to a very small value.

Although the illustrated embodiment uses the magnetic flux generating portion of the frequency generator formed as an integral end part of the rotor magnet of the motor, the magnetic flux generating portion may be a separate member independent of the rotor magnet of the motor so as to be fixed to an end surface of the rotor magnet or mounted in a position other than the rotor magnet.

The inventive frequency generator may be used not only in a driving motor for driving a rotary cylinder head but also in detection of the speed of a rotary multi-surface mirror device or other rotary body.

Figure 7:
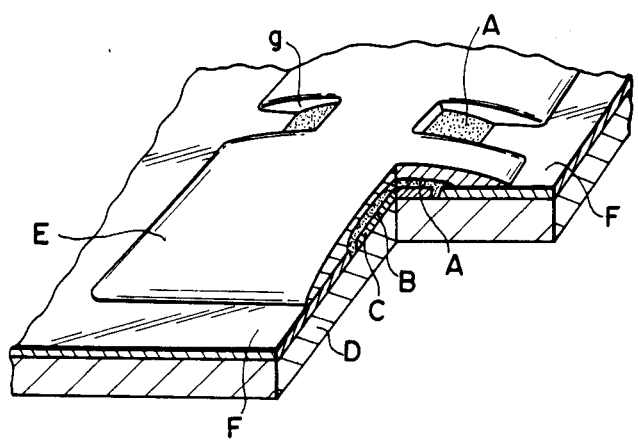
FIG. 7 is a fragmentary perspective view of a printed wiring board taken as a further embodiment of the invention.
Figure 8:
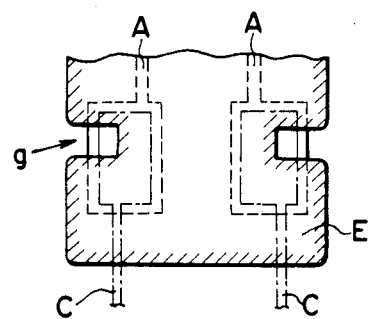
FIG. 8 is a fragmentary plan view of the printed wiring board of FIG. 7 as viewed from an upper portion.
Figure 9:
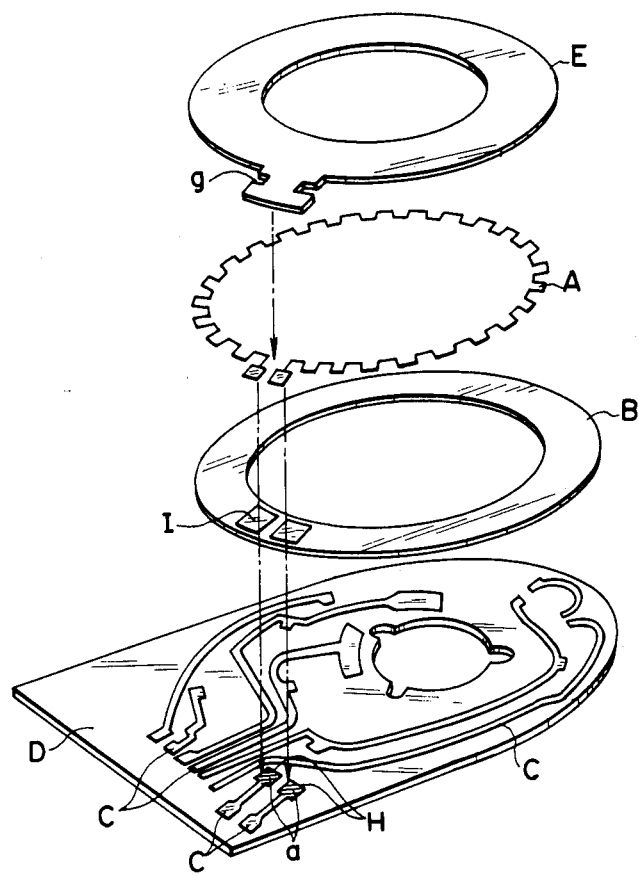
FIG. 9 is a schematic perspective view of an inventive printed wiring board used as a wiring board of a frequency generator.

In a further embodiment shown in FIGS. 7, 8 and 9, a printed wiring board formed by providing a lower conductive pattern (wiring pattern) C on an insulating base plate D and by overlaying an upper conductive pattern (generating coil pattern) A on the lower conductive pattern D via an insulating layer (undercoat) B. Electrodes of the upper and lower conductive patterns A and C are connected together, and an overcoat E is provided on the upper conductive pattern A except at least a selected portion of the electrode.

In FIG. 7, F designates a resist layer other than the insulating layer B. Further, the insulating layer B is partly removed to provide an opening I at a portion corresponding to an electrode H where the lower conductive pattern and the upper conductive pattern are connected.

In the printed wiring board according to the further embodiment, a portion g in the form of a cutout, for example, not covered by the overcoat E is provided at a portion above a contacting portion of the upper and lower conductive patterns A and C. Therefore, when gas is generated from the upper conductive pattern A due to heat which is applied after the overcoating, the gas is discharged to the exterior through the exposed portion g to remove dry spots in the contact portion.

Further, since the overcoat E is provided on the contact portion of the upper and lower conductive patterns A and C except the exposed portion g, the conductor surface is exposed in a small limited area alone to substantially prevent migration (a phenomenon that ions are moved by an electric field. In an electronic circuit, ions evaporate from a metal conductor surface in presence of chlorine or other impurity element and humidity and move to another conductor having a different potential thereby to produce incomplete insulation on a substrate surface).

Figure 10:
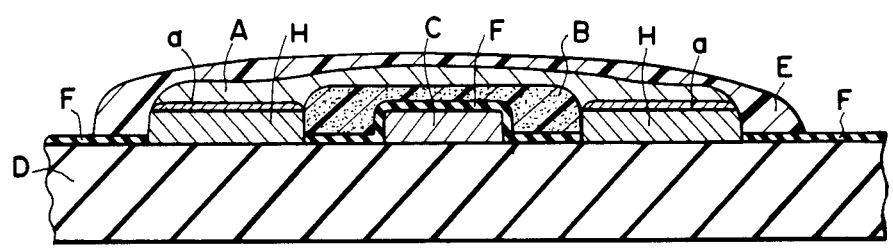
FIG. 10 is a fragmentary cross-sectional view of a finished wiring board.

In particular the printed wiring board of the frequency generator shown in FIGS. 9 and 10 completely prevents migration because its output voltage is 100 mV or less.

In the embodiment, a metal plating layer a is provided on an electrode H of a copper etching pattern C formed on an insulating base plate D. Therefore, the metal plating layer a reduces the influence of heat applied in the process of providing an insulating layer B or the influence of the environment, so as to prevent oxidation of the electrode H of the copper etching pattern C. Therefore, a better contact between the electrode H of the copper etching pattern C and the electrode of the generating coil pattern A is maintained to prevent non-conduction at the connected portion.

Since solder or nickel forming the metal plating layer a are less subject to oxidation than copper and conjoin well with the electrode of the generating coil pattern, they are suitable for use as a plating material.

In FIG. 10, F designates a resist layer, and E denotes an overcoat layer provided on the generating coil pattern A to protect same.

According to this invention, since the generating coil pattern of the frequency generator is provided on the wiring pattern of the circuit board via the insulating layer, it is possible to form the generating coil pattern, using a printing board having a single printing surface and a small pattern forming area. Therefore, it is not necessary to use two circuit boards in a stack or use a wiring board having double printing surfaces. As a result, an economical frequency generator can be provided. Further, since the generating coil pattern can be printed, referring to the center hole of the circuit board which is concentric with the rotary body, positional deviation of the center of the generating coil is substantially removed, and the wow flutter of the output of the frequency generator is significantly diminished.

What is claimed is:

1. A frequency generator, comprising: a rotary body which rotates about a shaft, a magnetic flux generating portion which rotates concentrically of said shaft, a generating coil pattern opposed to said magnetic flux generating portion, and a circuit board, wherein said circuit board has one surface which faces said flux generating portion and which has a plurality of circuit elements, said generating coil pattern and a wiring pattern connecting said circuit elements disposed thereon, and wherein said generating coil pattern is printed on an undercoat which serves as an insulating layer and is provided on said wiring pattern.

2. The frequency generator according to claim 1 wherein said circuit board has a hole for accepting said shaft, and is disposed so that the center of said hole coincides with the center of said shaft, said generating coil pattern being formed on a concentric circle whose center is the center of said hole.

3. The frequency generator according to claim 1 wherein said generating coil pattern is formed by printing silver paste on said insulating layer.

4. The frequency generator according to claim 2 wherein said generating coil pattern is printed while said circuit board is positionally fixed with reference to said hole in order that the center of said hole coincides with the center of said generating coil pattern.

5. The frequency generator according to claim 1 wherein said generating coil pattern is formed in an annular configuration which is concentric with said hole.

6. The frequency generator according to claim 1 wherein said generating coil pattern is overcoated by a second insulating layer which includes an opening where said generating coil is partly exposed.

7. The frequency generator according to claim 1 wherein an electrode portion is associated with said wiring pattern for connecting it to said generating coil pattern, said insulating layer having an opening at a portion corresponding to said electrode portion, said electrode portion of said wiring pattern being connected to said generating coil pattern through said opening.

8. The frequency generator according to claim 7 wherein said electrode portion is metal-plated.

9. The frequency generator according to claim 8 wherein said metal plating is nickel- or solder-plating.

10. The frequency generator according to claim 1, wherein said circuit board is a single flat board having a conductor pattern on only one side thereof, said conductor pattern being said wiring pattern.

* * * * *